United States Patent
Sklar (10) Patent No.: US 7,548,725 B1
(45) Date of Patent: Jun. 16, 2009

(54) NULL BEARER SYSTEM AND METHOD OF CONNECTING E1 DATA TO THE PUBLIC SWITCHED TELEPHONE NETWORK

(75) Inventor: Richard E. Sklar, Huntington Beach, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 311 days.

(21) Appl. No.: 10/252,485

(22) Filed: Sep. 23, 2002

(51) Int. Cl.
*H04B 7/185* (2006.01)

(52) U.S. Cl. .................. 455/12.1; 455/427; 455/431

(58) Field of Classification Search ........... 455/12.1, 455/427, 428, 431, 432.2
See application file for complete search history.

(56) References Cited

U.S. PATENT DOCUMENTS

| | | | | |
|---|---|---|---|---|
| 5,982,851 | A * | 11/1999 | Kennedy et al. | 379/21 |
| 6,226,304 | B1 * | 5/2001 | Ravishankar et al. | 370/527 |
| 6,278,876 | B1 * | 8/2001 | Joshi et al. | 455/427 |
| 6,421,424 | B1 * | 7/2002 | Creamer et al. | 379/15.01 |
| 6,760,778 | B1 * | 7/2004 | Nelson et al. | 709/246 |
| 2003/0055975 | A1 * | 3/2003 | Nelson et al. | 709/227 |

FOREIGN PATENT DOCUMENTS

WO     WO 9603846 A1 * 2/1996

* cited by examiner

*Primary Examiner*—Duc Nguyen
*Assistant Examiner*—Angelica M Perez (57) ABSTRACT

A demonstration telecommunication system can be utilized with a public switched telephone network (PSTN) operating in a first format. The demonstration telecommunication system allows a telecommunication network operating in a second format to communicate with the PSTN. The first format is different than the second format. The demonstration communication system includes a null bearer system including a PSTN interface for the PSTN and a telecommunication network interface for the telecommunication network. The null bearer system can be utilized with an avionic telephone system.

20 Claims, 5 Drawing Sheets

NULL BEARER SYSTEM AND METHOD OF CONNECTING E1 DATA TO THE PUBLIC SWITCHED TELEPHONE NETWORK

BACKGROUND OF THE INVENTION

The present disclosure relates generally to communication systems. More particularly, the present disclosure relates to an interface between the public switched telephone network (PSTN) and another network generally requiring a bearer system.

Certain networks, such as on-board aircraft networks, require a bearer system to interface it to another network or telephone system. For example, the Rockwell Collins Passenger Systems Integrated Phone System (RCPSIPS) requires a bearer system to communicate with the public switched telephone network (PSTN). The RCPSIPS is an E1 data network that can initiate and receive phone calls on an aircraft. The RCPSIPS interfaces with the PSTN through a bearer system, such as a Satcom-based system to provide telecommunication between it and a ground telephone coupled to the PSTN.

Figure 1:
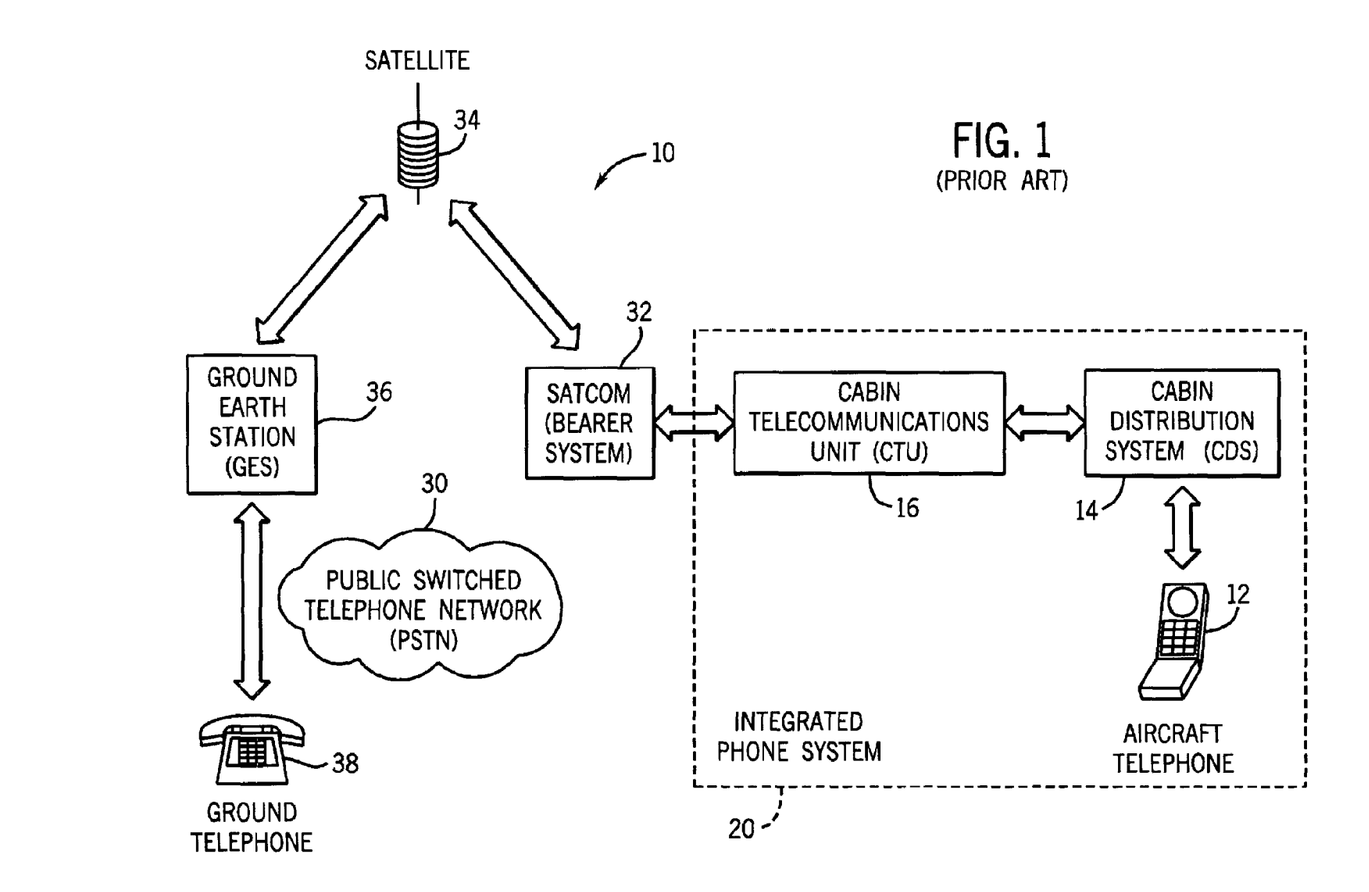
FIG. 1 is a general block diagram of a conventional integrated phone system coupled to a public switched telephone network (PSTN) through a Satcom-based bearer system.

With reference to FIG. 1, a conventional communication system 10 can be embodied as a PSTN coupled to an RCPSIPS. System 10 includes an integrated phone system 20, a Satcom system 32, a satellite 34, a PSTN 30 and a ground earth station 36. A telephone 38, modem or other communication device can be coupled to PSTN 30.

Integrated phone system 20 can be located on an aircraft, vehicle, or other structure. Integrated phone system 20 includes cabin telecommunications unit (CTU) 16, cabin distribution system (CDS) 14, and at least one aircraft telephone 12, modem, or other communication device. Integrated phone system 20 can operate according to the ARINC standard 746.

Integrated phone system 20 is coupled to public switched telephone network (PSTN) 30 via a bearer or Satcom-based system (e.g., Satcom system 32, satellite 34, and ground earth station 36). Aircraft telephone 12 can be a passenger handset that is connected to cabin distribution system 14. Cabin distribution system 14 is coupled to cabin telecommunications unit 16 which is coupled to Satcom system 32.

Cabin distribution system 14 can be, for example, a Rockwell Collins AVU, ADB, and optional PESC. Cabin telecommunications unit 16 can be manufactured, for example, by AT&T, MORS, and BAE (formerly, GTE). System 14 communicates to cabin telecommunications unit 16 via an E1 or other data link. To establish a telephone call, cabin telecommunications unit 16 communicates via Satcom system 32, satellite 34 and ground earth station 36 to PSTN 30. PSTN 30 communicates with a handset, such as, telephone 38.

When system 20 is demonstrated, such as at a trade show or otherwise to a customer, a Satcom-based system (system 32, satellite 34, and station 36) or other bearer system provides an interface for communications to PSTN 30 because a non-satellite based interface is generally not available to PSTN 30. A Satcom-based system must be employed even though system 20 is not being utilized in an aircraft or other vehicle isolated from land connections to PSTN 30. For example, when system 20 is demonstrated, system 32 provides connectivity to PSTN 30 through satellite 34 and station 36 as if system 20 is being utilized in an aircraft.

In the avionics business industry, demonstrations of system 20 are performed at WAEA and other shows and are evaluated by airplane manufacturers and airline customers. Such demonstrations require the establishment of an expensive Satcom-based system including system 32, satellite 34 and station 36. Manufacturers of systems, such as cabin telecommunication units (e.g. unit 16), also require a satellite-based system for demonstrations.

Conventional bearer systems are expensive and undesirable for several reasons. First, per call costs associated with using a Satcom-based system are expensive. Second, such Satcom-based systems are subject to service discontinuation and require antennas which must be serviced by qualified personnel. Third, such Satcom-based systems require expensive equipment which must be leased. Fourth, if a Satcom-based system is not available for various reasons, the demonstration of system 20 is seriously degraded.

Another conventional technique for demonstrating system 20 is by coupling it to simulation phone equipment, such as, systems manufactured by Tekelec or Idacom. The simulation systems are provided to simulate a Satcom-based system and a PSTN, but are incapable of establishing real telephone calls.

The simulation systems typically contain an integrated handset to which calls are directed. However, the simulation does not allow real phone calls to be demonstrated and evaluated on the PSTN. The simulation systems are relatively inflexible because they cannot simulate a busy phone, no answer conditions, other telephone status, etc. Further, the simulation systems are not capable of generating incoming phone calls or data calls. Accordingly, the above-listed aspects of integrated phone system 20 and its interaction with an actual PSTN 30 cannot be effectively demonstrated using Tekelec or Idacom systems.

Other communication systems have utilized bearer systems, such as, Terrestrial Flight Telephone Systems (TFTS) and North American Terrestrial Systems (NATS) systems. However, these systems suffer from similar demonstration disadvantages as Satcom-based systems because TFTS and NATS systems must be established to effectively demonstrate and evaluate the communication system.

Thus, there is a need for a bearer system which can be coupled between a public switched telephone network (PSTN) and an integrated phone system which does not require the expense, availability, and expertise associated with Satcom-based systems and other conventional bearer systems. Further, there is a need for a method of demonstrating an integrated phone system which can receive phone calls from a public switched telephone network (PSTN). Further still, there is a need for an E1 data system which can be easily coupled to a public switched telephone network (PSTN) for demonstration and evaluation purposes. Yet further, there is a need for a null bearer system that can support real telephone calls between an Integrated Phone System handset and any phone in the world without the need for a satellite-based system.

SUMMARY OF THE INVENTION

An exemplary embodiment relates to a demonstration telecommunication system for use with a PSTN operating in a first format. The demonstration telecommunication system allows a telecommunication network operating in a second format to communicate with the PSTN. The first format is different than the second format. The demonstration telecommunication system includes a null bearer system. The null bearer system includes a PSTN interface for the PSTN and a telecommunication network interface for the telecommunication network. The null bearer system communicates in the first format at the PSTN interface and in the second format at the telecommunication network interface. The null bearer system translates information between the first format and the second format.

Another exemplary embodiment relates to a demonstration system for demonstrating a vehicle communication system. The vehicle communication system utilizes a satellite-based communication system to communicate with a PSTN when in normal operation. The PSTN communicates in a PSTN format. The demonstration system includes the vehicle communication system operating in a second format different than the PSTN format and a non-satellite-based bearer system. The non-satellite-based bearer system includes a PSTN interface for the PSTN and a vehicle communication interface for the vehicle communication system. The non-satellite-based bearer system communicates in the first format at the PSTN interface and in the second format at the vehicle communication system interface. The null bearer system communicates information in the second format at the vehicle communication interface to the PSTN in the PSTN format.

Yet another exemplary embodiment relates to a method of demonstrating a vehicle communication system. The vehicle communication system utilizes a satellite-based communication system to communicate with the PSTN when in normal operation. The PSTN communicates in a PSTN format. The method includes providing data from the vehicle communication system in a first format to a bearer system, translating the data to the PSTN format in the bearer system, and providing the data in the PSTN format directly from the bearer system to the PSTN.

Still another exemplary embodiment relates to a telecommunication system for use with the PSTN operating in a first format. The telecommunication system includes a communication network operating in a second format. The first format is different than the second format. The telecommunication system also includes a bearer means for allowing the communication network operating in the second format to communicate with the PSTN. The bearer means communicates in the first format at a PSTN interface and in the second format at a communication network interface.

BRIEF DESCRIPTION OF THE DRAWINGS

Exemplary embodiments will hereafter be described with reference to the accompanying drawings, wherein like numerals denote like elements, and.

DETAILED DESCRIPTION OF THE PREFERRED EMBODIMENTS

Figure 2:
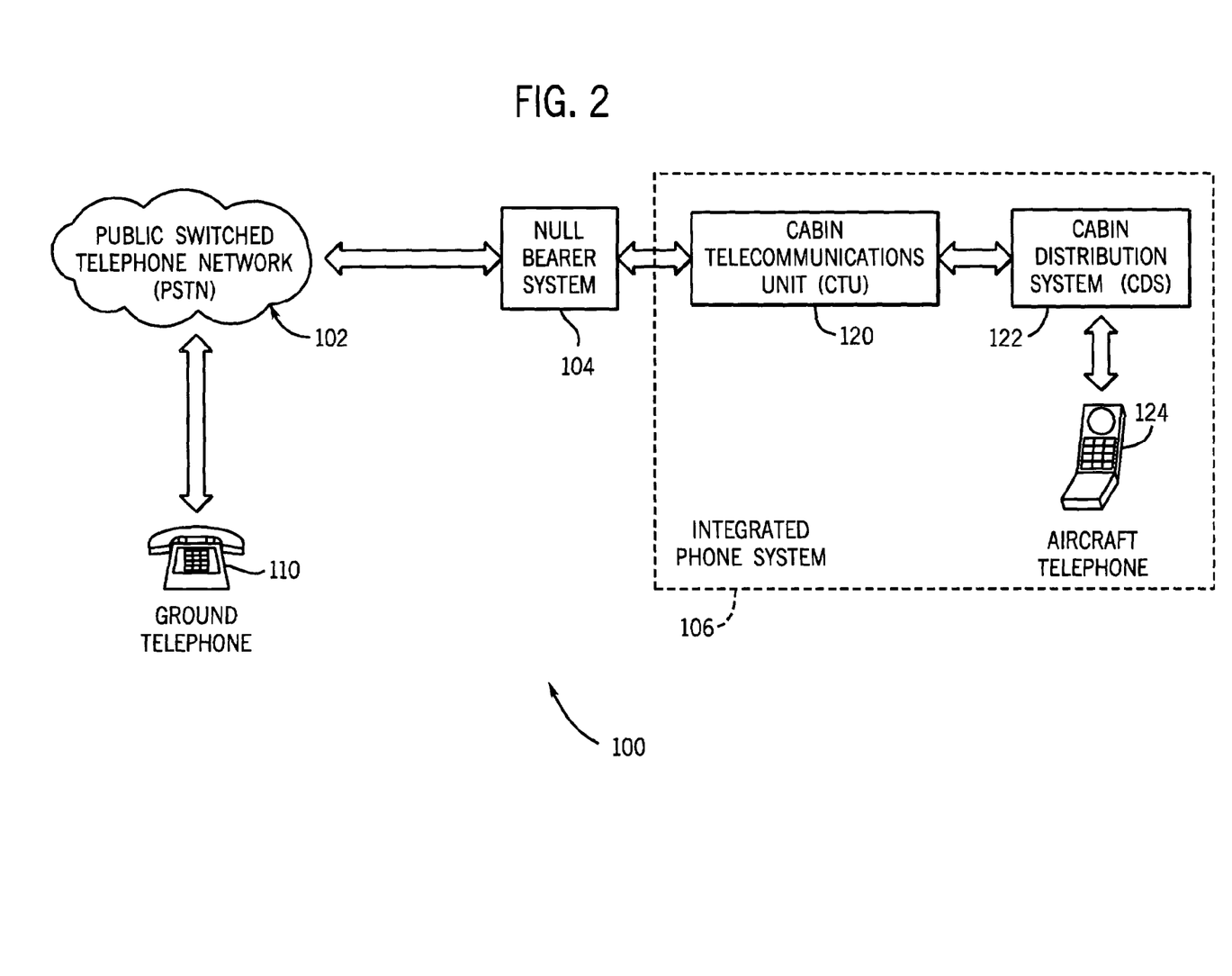
FIG. 2 is a general block diagram of a communications system utilizing a null bearer system in accordance with an exemplary embodiment.

With reference to FIG. 2, a communication system 100 includes a public switched telephone network (PSTN) 102, a null bearer system 104, and an integrated phone system 106. PSTN 102 can be coupled to a handset, such as, telephone 110, a modem, a data network, a cellular network, a telecommunications system, etc.

Integrated phone system 106 can include a cabin telecommunications unit (CTU) 120, a cabin distribution system (CDS) 122, and a handset, such as, an aircraft telephone 124. System 106 can be any type of vehicle communication system. System 106 can include a computer network for providing intranet and Internet access.

In one embodiment, integrated phone system 106 is an RCPSIPS or part of an in-flight entertainment system. However, any type of integrated phone system, computer network, or communication system can be utilized. In another example, integrated phone system 106 can be any avionic phone system or an E1 data network. For example, system 106 can include or be a cabin telecommunications unit manufactured by AT&T, MORS, BAE or other manufacturer. In another example, system 106 can be or include a cabin distribution system 122, manufactured by Rockwell Collins or other manufacturers.

In FIG. 2, integrated phone system 106 is coupled by null bearer system 104 directly to PSTN 102 via an interface 132 (FIG. 3) (e.g. a standard RJ11 tip/ring). Advantageously, the use of null bearer system 104 allows for reliable origination and reception of real telephone calls at the same cost as would be paid if the call were from a standard telephone set (e.g., no Satcom or ground-earth-station cost or reliability issues). Further, null bearer system 104 does not require the complex set-up associated with Satcom systems. In one embodiment, system 104 requires a power outlet, a connection to PSTN 102 and a connection to system 106.

According to one embodiment, system 106 communicates to PSTN 102 through null bearer system 104. PSTN 102 operates in a PSTN format. Communications between unit 120, 122 and 124 are made according to an E1 or other data format and provided to null bearer system 104. Null bearer system 104 translates data or information in the E1 data format to the PSTN format and provides it to PSTN 102. For example, a call originating at handset 124 is provided through system 122 and unit 120 to null bearer system 104. Null bearer system 104 translates the call information in the E1 data format and provides it in a PSTN format to PSTN 102.

Figure 3:
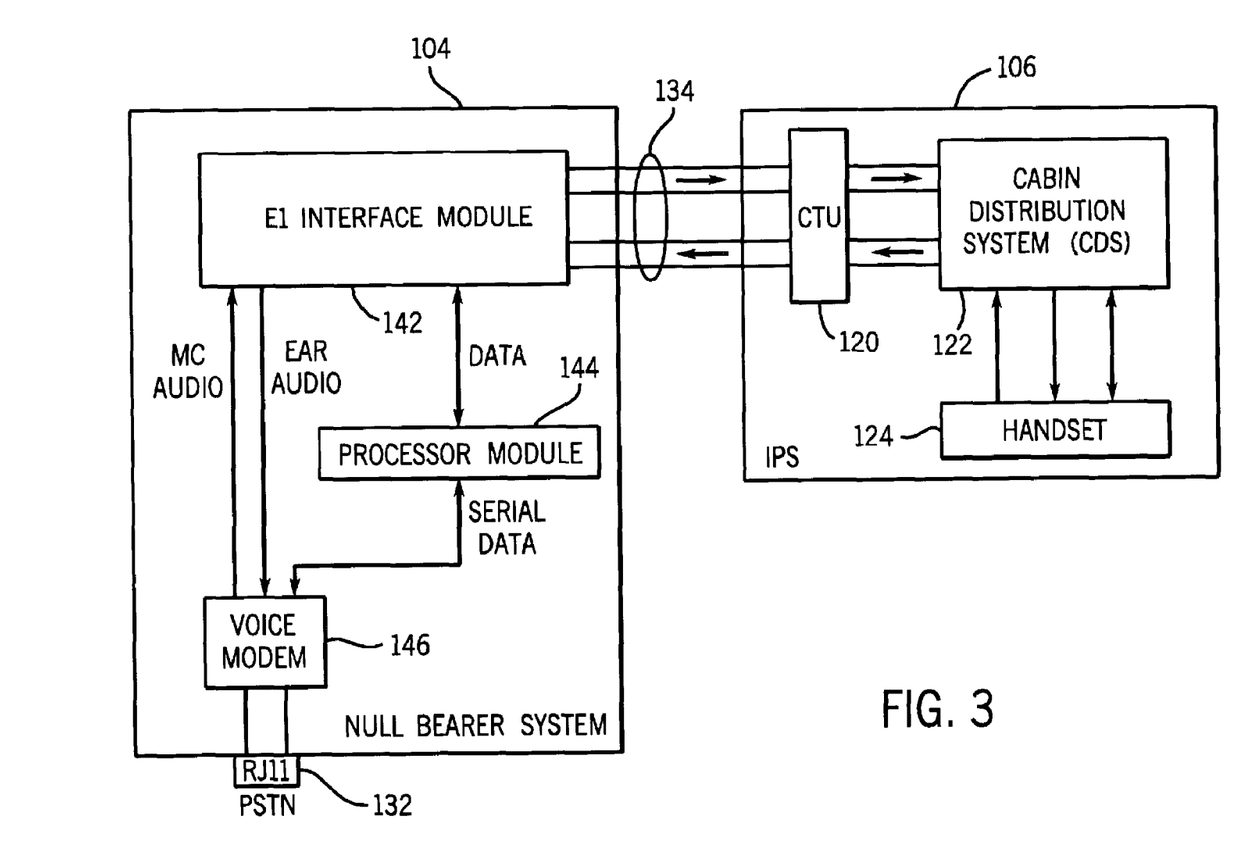
FIG. 3 is a more detailed general block diagram of an embodiment of the null bearer system illustrated in FIG. 2.

With reference to FIG. 3, null bearer system 104 interfaces to PSTN 102 (FIG. 2) at interface 132 and to integrated phone system 106 at an interface 134. Interface 134 can be a standard bidirectional E1 data interface.

Null bearer system 104 includes an interface module 142, processor module 144, and a voice modem 146. Generally, null bearer system 104 provides translation for data translated in a first format associated with system 106 and a second format associated with PSTN 102.

In a preferred embodiment, PSTN 102 operates in a PSTN format and system 106 operates in a E1 data format. The E1 data format is a frame format which includes a number of time slots. Each of the time slots contains one sample of voice data and/or control data (e.g. ring, telephone number, etc.). The E1 data format is not described in a limiting fashion. Null bearer system 104 can be modified to translate a variety of data formats.

E1 data from CTU 120 of system 106 is communicated to interface module 142 rather than to a satellite data unit (SDU), a part of a conventional Satcom-based system. Interface module 142 is preferably an E1 interface module configured to perform at least one of the following functions: accept differential E1 frames from CTU 120; terminate the link with proper impedance; recover data from E1 frames; send this recovered data to processor module 144; accept data from processor module 144; convert this data from processor module 144 to data in the E1 format; and transmit E1 frames to the CTU 120 in a differential format. E1 interface module 142 can be configured by software.

Upon command from processor module 144, interface module 142 extracts voice data from an assigned time slot of an E1 data frame. Interface module 142 converts the voice data to an analog format and provides this signal to voice modem 146. Interface module 142 also accepts an analog voice signal from voice modem 146 and converts the analog voice signal to digital format. Upon a command from processor module 144, module 142 inserts the voice data into an assigned time slot of an E1 data frame.

E1 interface module 142 can be manifested as a programmed module. In one exemplary embodiment, module 142 is a modified AVU as explained below in FIG. 4, a modified seat telephone module (STM) by Rockwell Collins, or other E1 data device. Various devices and processors can be modified through software to provide the function of module 142.

Processor module 144 can be manifested as any device configured by software to implement data transfers between interface 132 and module 142. In one embodiment, processor module 144 is a 68K processor or controller. In a preferred embodiment, module 144 is a processor executing software to perform at least one of the following functions: receiving data from interface module 142 and interpreting the received time slot data in the same manner as would a conventional Satcom-based system, such as, an ARINC system (e.g., time slot 16 data according to ARINC 741/Q.931); providing attention (AT) commands to voice modem 146 using the serial data link for outgoing calls based upon dialing information contained within the E1 data; receiving AT status messages from voice modem 146 and conveying this information to module 142 as appropriate; and providing AT commands to the voice modem for establishing and disconnecting phone calls.

Voice modem 146 can be manifested as a 56K analog modem device. Voice modem 146 preferably performs at least one of the following of the functions: accept standard attention (AT) commands from processor 144; performs appropriate tone generator functions, such as, generating DTMF tones; applying DTMF tones to interface 132; send call status to processor module 144 via AT messages; accept a single wire analog voice or data signal from module 142 and convert it to a tip/ring format for reception by PSTN 102 via interface 132 (e.g., a tip/ring interface); and accept an analog voice or data signal from PSTN 102 via interface 132 (e.g., a tip/ring interface and convert it to a single wire analog signal and provide it to module 142).

In operation, calls can be originated at passenger handset or telephone 124 to any phone or modem coupled to PSTN 102, such as telephone 110 (FIG. 2). Calls can also be originated at any phone or modem coupled to PSTN 102 to any modem or handset in system 106. With reference to FIGS. 2 and 3, the operation of system 100 is described below as follows.

Appropriate messages can be sent back and forth between handset 124, CDS 122 and CTU 120 to guide a passenger through the calling process, to validate credit card information, and gather the remote phone number to be called. During this time, CTU 120 communicates with null bearer system 104 in a similar fashion to the communication with a Satcom-based system to establish its availability. Preferably, the data is processed within module 144 according to Satcom standards (e.g., Arinc 741/Q.931).

CTU 120 can send an appropriate set-up message to null bearer system 104 containing the dialing number of telephone 110 (e.g., a remote phone to PSTN 102). During this time, the E1 time slot to be used for subsequent voice communications is also established. Processor module 144 sends the dialing number to voice modem 146 via serial AT commands, which attempts to establish a connection. AT commands can be used to communicate via modems. If successful, modem 146 sends status of AT messages back to module 144. Module 144 generates appropriate data messages and provides them to module 142 which sends the appropriate messages to CTU 120.

Once connect status has been received by processor module 144 from voice modem 146, processor module 144 can command module 142 to extract the digitized sound or voice from the assigned E1 time slot, convert it to an analog format and provide it to modem 146. In a similar matter, E1 interface module 142 is commanded by processor 144 to convert the analog voice from modem 146 to a digital format and insert it into the assigned E1 time slot. This E1 data frame is continuously sent to CTU 120 for use at handset 124. If a passenger at handset 124 ends a conversation, a disconnect message can be sent to CTU 120 from CDS 122. CTU 120 sends an appropriate command to null bearer system 104.

Interface module 142 receives the disconnect message and provides it to processor module 144. Module 144 commands modem 146 to disconnect the established PSTN voice link associated with telephone 110 and telephone 124. Voice modem 146 disconnects the call and sends the new status to processor module 144 which commands module 142 to cease the time slot extraction and insert process and send the appropriate message back to CTU 120. If the remote phone in issue is disconnected, voice modem 146 sends this status to processor module 144 and a similar disconnection process ensues.

System 104 handles data calls in a similar manner with standard modem data tones, rather than voice being transmitted onto and received from interface 132 of PSTN 102. Error conditions can be appropriately handled in accordance with conventional processes.

Incoming calls are also handled according to a similar process. System 104 can act in the same manner as a Satcom system. Calls from ground telephone 110 are received through PSTN 102 (FIG. 2) at interface 132. Voice modem 146 provides control and voice data to system 106 through module 142 and module 144.

Figure 4:
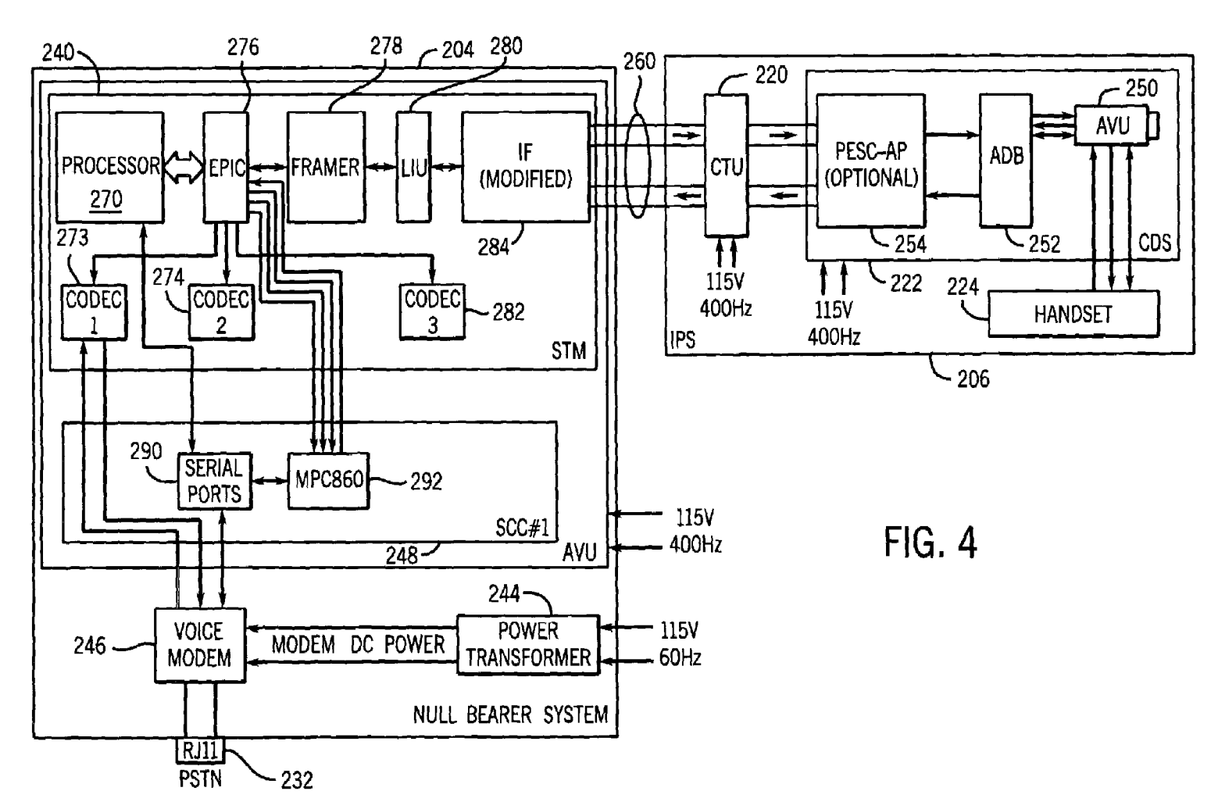
FIG. 4 is a more detailed general block diagram of another embodiment of the null bearer system illustrated in FIG. 2 utilizing a modified AVU.

With reference to FIG. 4, an embodiment of system 100 includes null bearer system 204 and an integrated phone system 206. Integrated phone system 206 includes a CTU 220, a telephone handset 224 and a cabin distribution system CDS 222. CDS 222 includes an audio video unit (AVU) 250 and an area distribution box (ADB) 252. System 222 can also include an optional passenger entertainment service controller PESC-AP 254 and can be a system sold by Rockwell Collins.

Null bearer system 204 includes a seat telephone module (STM) 240, a voice modem 246, and a seat controller card (SCC) 248. Module 240 and SCC 248 can be part of an AVU manufactured by Rockwell Collins (e.g., AVU 250).

Seat telephone module 240 can be the type sold by Rockwell Collins and be designed for use of CODEC 273, 274 and 282 by the passenger. Although only one voice modem 246 is shown, an alternative embodiment can include three or more modems, one for each codec in module 240. Module 240 and seat controller card 248 perform the operations of interface module 142 and processor module 144 discussed with reference to FIG. 3.

In addition, null bearer system 204 can include a power transformer 244 for converting line voltage from 115 volts at 60 Hertz to a power level associated with modem and other units. System 204 can also include interface 232.

System 204 connects to PSTN 102 via interface 232 (e.g., a PSTN jack). Advantageously, STM 240 can reside within system 206 when it is embodied as an RCPS AVU (although shown as separate from system 206 in FIG. 4). STM 240 performs the function of E1 interface module 142 (FIG. 3). SCC 248 is preferably within AVU 250 of system 206 (although shown in FIG. 4 as part of bearer system 204) and forms tasks associated with processor module 144.

An interface 260 between CTU 220 and STM 240 is shown connected in a manner somewhat similar to an interface utilized by an STM 240 within a standard CDS (receiving and transmitting E1 data within AVU 250). CTU 220 generally uses balanced, differential E1 (BE1) and STM 240 is modified to accept and transmit this form of E1 data. A standard STM 240 can be modified for BE1 data by making wiring changes within STM 240. Module 240 includes a processor 270, CODEC 272, CODEC 274, an EPIC 276, a framer 278, an LIU 280, CODEC 282, and an IF module 284. IF module 284 performs the function of receiving and transmitting E1 signals. SCC 248 includes serial ports 290 and a controller 292. Controller 292 is preferably an MC 68000 controller.

With reference to FIGS. 3 and 4, the operation of null bearer system 204 and integrated phone system 206 is discussed below as follows.

E1 data is transmitted to controller 292 of SCC 248. Software associated with STM 240 is modified to read E1 data as required. SCC 248 performs the functions of processor module 144 of FIG. 3. Software for SCC 248 preferably emulates a Satcom system. Voice modem 246 performs similar to voice modem 146 discussed with reference to FIG. 3 and provides a connection to interface 232.

Figure 5:
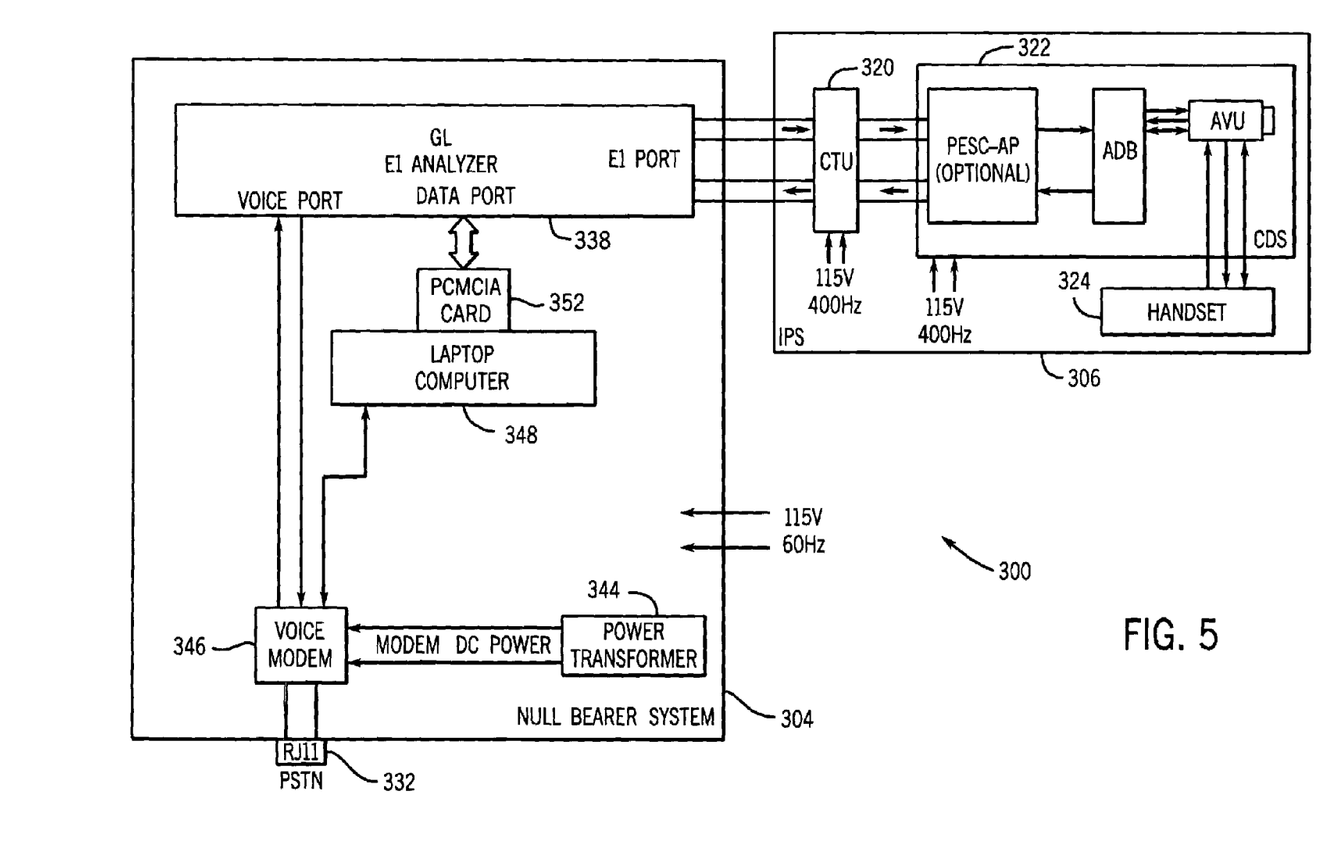
FIG. 5 is a more detailed general block diagram of yet another embodiment of the null bearer system illustrated in FIG. 2 using a COTS system.

With reference to FIG. 5, communication system 100 is embodied as a system 300 and includes an integrated phone system IPS 306 and a null bearer system 304. IPS 306 includes a CTU 320, a CDS 322, and handset 324. Null bearer system 304 includes a GL analyzer 338, an interface 332, a voice modem 346, a laptop computer 348, and a power transformer 344. Interface 332 of voice modem 346 and power transformer 344 is similar to interface 232, voice modem 246, and power transformer 244 (FIG. 4).

System 300 can utilize commercially available hardware with modified software instructions to achieve the functions described with reference to FIG. 3. Analyzer 338 can be an E1 analyzer manufactured by GL Communications or an equivalent thereof. Analyzer 338 performs the operations of E1 interface module 142 (FIG. 3). Computer 348 can be a commercially available computer programmed to perform tasks associated with processor module 144 (FIG. 3). Computer 348 can include a PCMCIA card 352.

Front and rear panels of analyzer 338 can support connectors for system 300. Analyzer 338 may support T1 data, rather than E1 data, and may contain two independent circuits. The rear panel of analyzer 338 can include an E1 RJ45 connector that can be used for communication with CTU 320. PCMCIA card 352 can be fed by a D-type connector and terminated at computer 348. The front panel of analyzer 338 can contain analog audio connectors that can be used for voice modem 346.

Software can be developed to provide the function associated with discussion of FIG. 3. In addition, commercial software available from GL Communications or others can be utilized to perform tasks such as bit error rate measurements.

It is understood that while preferred embodiments and specific examples are given, they are for the purpose of illustration only and are not limited to the precise details disclosed. For example, although specific hardware is discussed, the functions and operations discussed above can be implemented with a variety of equipment. Various modifications may be made to the details provided above without departing from the scope and range of equivalents of the claims.

What is claimed is:

1. A demonstration telecommunication system for use with a PSTN operating in a first format, a telecommunication network utilizing a satellite-based bearer system to communicate with the PSTN when in normal operation, the demonstration telecommunication system allowing the telecommunication network operating in a second format to communicate with the PSTN, wherein the first format is different than the second format, the demonstration telecommunication system comprising:
    a null bearer system including a PSTN interface for the PSTN and a telecommunication network interface for the telecommunication network, the null bearer system communicating in the first format at the PSTN interface and in the second format at the telecommunication network interface, the null bearer system translating information between the first format and the second format,
    wherein the null bearer system simulates the satellite-based bearer system used in normal operation of the telecommunication network to translate the information between the first format and the second format.

2. The demonstration telecommunication system of claim 1 wherein the second format is a digital format.

3. The demonstration telecommunication system of claim 2 wherein the second format is an E1 data format.

4. The demonstration telecommunication system of claim 1 wherein the telecommunication network is an aviomic telecommunication network.

5. The demonstration telecommunication system of claim 1 wherein the null bearer system includes a voice modem.

6. The demonstration telecommunication system of claim 5 wherein the null bearer system includes a processor module coupled to the voice modem.

7. The demonstration telecommunication system of claim 6 wherein the null bearer system includes an E1 interface module.

8. A demonstration system for demonstrating a vehicle communication system, the vehicle communication system utilizing a satellite-based communication system to communicate with a PSTN when in normal operation, the PSTN communicating in a PSTN format, the vehicle communication system operating in a second format different than the PSTN format, the demonstration system comprising:
    a non-satellite-based bearer system including a PSTN interface for the PSTN and a vehicle communication interface for the vehicle communication system, the non-satellite-based bearer system communicating in the PSTN format at the PSTN interface and in the second format at the vehicle communication system interface, the non-satellite-based bearer system communicating information in the second format at the vehicle communication interface to the PSTN in the PSTN format,
    wherein the non-satellite-based bearer system replicates the satellite-based communication system used in normal operation of the vehicle communication system to communicate information in the second format at the vehicle communication interface to the PSTN in the PSTN format.

9. The demonstration system of claim 8 wherein the second format is an E1 data format.

10. The demonstration system of claim 9 wherein the non-satellite-based bearer system further comprises:
    a processor.

11. The demonstration system of claim 8 wherein the vehicle communication system is an RCPS IPS.

12. A method of demonstrating a vehicle communication system, the vehicle communication system utilizing a satellite-based communication system to communicate with a PSTN when in normal operation, the PSTN communicating in a PSTN format, the vehicle communication system communicating in a second format different than the PSTN format, the method comprising:
- providing data from the vehicle communication system in the second format directly to a null bearer system;
- translating the data to the PSTN format in the null bearer system; and
- providing the data in the PSTN format directly from the null bearer system to the PSTN,
- wherein the null bearer system replicates the satellite-based communication system used in normal operation of the vehicle communication system to communicate data in the second format at the vehicle communication interface to the PSTN in the PSTN format.

13. The method of claim 12 further comprising:
- providing second data in the PSTN format directly from the PSTN to the null bearer system;
- translating the second data in the PSTN format in the null bearer system to the first format; and
- providing the second data in the first format to the vehicle communication system.

14. The method of claim 13 wherein the second data is representative of an incoming call from the PSTN.

15. The method of claim 14 wherein the incoming call is from a telephone connected to the PSTN.

16. The method of claim 12 wherein the data is representative of a call originating at the vehicle communication system.

17. A demonstration telecommunication system for use with a PSTN operating in a first format, the telecommunication system comprising:
- a communication network operating in a second format, wherein the first format is different than the second format, and wherein the communication network utilizes a satellite-based bearer means to communicate with the PSTN when in normal operation; and
- a non-satellite-based null bearer means for allowing the communication network operating in the second format to communicate with the PSTN, the null bearer means communicating in the first format at a PSTN interface and in the second format at a communication network interface,
- wherein the null bearer means simulates the satellite-based bearer means used in normal operation of the communication network.

18. The telecommunication system of claim 17 wherein the second format is a digital format.

19. The telecommunication system of claim 18 wherein the second format is an E1 data format.

20. The telecommunication system of claim 19 wherein the communication network is an avionic telecommunication network.

* * * * *